United States Patent

[11] 3,615,889

| [72] | Inventor | Francis Clyde Rauch |
|---|---|---|
| | | Stamford, Conn. |
| [21] | Appl. No. | 855,400 |
| [22] | Filed | Sept. 4, 1969 |
| [45] | Patented | Oct. 26, 1971 |
| [73] | Assignee | American Cyanamid Company |
| | | Stamford, Conn. |

[54] CHEMICAL TREATMENT OF METAL
10 Claims, No Drawings

[52] U.S. Cl. .................................................. 148/6.14 R, 148/6.27, 148/31.5
[51] Int. Cl. .................................................. C23f 7/00
[50] Field of Search .......................................... 148/6.14, 6.15, 6.27

[56] References Cited
UNITED STATES PATENTS

| 2,874,080 | 2/1959 | Schweitzer et al. | 148/6.14 R |
| 3,449,192 | 6/1969 | Hook | 148/6.14 R |

OTHER REFERENCES

Hayakawa et al. Chem. Abstracts Vol. 62 p. 8664c 1965, Denki Kagaku 29(1) 39–41 1961.

*Primary Examiner*—Ralph S. Kendall
*Attorney*—Frank M. Van Riet

ABSTRACT: A method for preparing metal surfaces for receipt of a coating such as a paint or adhesive (whereby increased coating adhesion and corrosion resistance is achieved) and the treated metal per se, are disclosed. The method comprises contacting the metal surface with various 8—hydroxy quinoline derivatives.

CHEMICAL TREATMENT OF METAL

BACKGROUND OF THE INVENTION

The use of various chemical materials in the treatment of metal surfaces to thereby render them corrosion resistant is well known to those skilled in the art. For example, British Patent No. 1,058,413 discloses the use of 8-hydroxy quinoline by allowing the quinoline to chemically react with a metallic surface and subsequently electrodepositing a resin or paint on the quinolineate film.

While this prior art technique generally provides acceptable corrosion resistance, the adhesion of surface coatings such as paints, varnishes, enamels, adhesives etc. thereto is not as substantial as would be desired.

SUMMARY

I have now found that the adhesion of coatings to metals can be materially increased or strengthened by first treating the metal with an 8-hydroxy quinoline derivative which is chemisorbed, i.e. chemically reacted with or absorbed via strong bonds. In this manner, a foundation or integral chemical or chemically bound coating is formed on the metal surface via reaction with the metal, which foundation is then more susceptible to an ultimate or surface coating, such as a paint or adhesive, than materials utilized in the past because of a group in the foundation which is reactive with the coating. That is to say, my method results in coatings which are more securely bonded or adhered to the foundation layer because the foundation is chemically bonded to the metal layer and an ultimate coating is chemically bonded to the foundation. More precisely, upon treating the metal according to my novel method, a reaction, as mentioned above, causes a strong bonding of the 8-hydroxy quinoline derivative layer to the metal. There then remains a second reactive group in the quinoline layer, which group is free to react with an exterior surface coating. This free reactive group chemically combines with the surface coating applied thereto to produce a metal having a coating tightly bonded thereto. Additionally, the corrosion resistance of the metal treated according to the present invention, with or without an extraneous coating on its surface, is at least as effective and in many cases better than known corrosion resistant systems.

DESCRIPTION OF THE INVENTION INCLUDING PREFERRED EMBODIMENTS

My novel process comprises treating a metal surface such as that of aluminum steel, iron, copper, titanium, etc. with a reactive 8-hydroxy quinoline derivative. The useful quinolines have the formula (I)

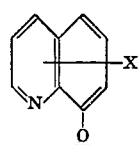

wherein X is a ⟨⟩—Y group, a —C(=O)—Y group, an alkylene ($C_2$-$C_8$)

group or an aliphatic radical containing an $NH_2$, OH or SH group, Y being $NH_2$, OH, SH or an alkylene ($C_2$-$C_8$) radical.

Examples of suitable compounds represented by formula I, above, include 8-hydroxy-5-(p-vinylphenyl) quinoline, 4-(p-aminophenyl)-8-hydroxy quinoline, 8-hydroxy-6-(p-hydroxyphenyl) quinoline, 8-hydroxy-5-(p-mercaptophenyl) quinoline, 5-carbamoyl-8-hydroxy qunoline, 4-carboxy-8-hydroxy quinoline, 8-hydroxy-3-thiolcarboxy quinoline, 4-acryloyl-8-hydroxy quinoline, 5-allylcarbonyl-8-hydroxy quinoline, 5-(3-aminopropyl)-8-hydroxy quinoline, 8-hydroxy-6-(2-hydroxyethyl quinoline, 8-hydroxy-4-(4-mercaptobutyl) quinoline, 3-allyl-8-hydroxy quinoline, 5-(4-butenyl)-8-hydroxy quinoline and the like. These specific compounds are mentioned herein for purposes of illustration only and the list is not meant to be inclusive of all possible useful compounds.

While not wishing to be bound by any particular theory, I believe that the

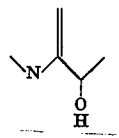

group of the 8-hydroxy quinolines react with the oxide layer formed on the surface of the metal to be treated. The existence of such oxide layers is well recognized by cogent workers in the art. Such layers form upon exposure of the metal to the atmosphere. After the quinoline-oxide bonding is complete, the reactive groups of the quinoline foundation layer are then free to react with the surface coating, i.e. paint, adhesive etc., thereby chemically bonding the coating to the metal. The quinoline-oxide bonding is pseudochemical in nature and can be more accurately described as a chemisorption or chelation of the quinoline by the metal.

The quinoline foundation layer may be applied to the metal surface, the metal first being thoroughly cleaned such as by degreasing with trichlorethylene etc. or other common techniques, by immersing, dipping, painting, brushing, wiping, spraying, etc. the metal article to be treated with solutions of one or more of said 8-hydroxy quinolines, for a length of time such that the metal surface absorbs or reacts with a sufficient amount of the quinoline. The metal is then merely removed from the solution and allowed to dry.

Additionally, the 8-hydroxy quinoline derivative can be applied to the metal by first incorporating it into the surface coating material, e.g. the paint or adhesive, and then applying the surface coating. In this manner, the quinoline can be added, for example, to the paint vehicle, and the paint then can be sprayed etc. onto the metal. Similarly, the quinoline can be added to one part of a two-part adhesive system and the adhesive can then be applied to the metal. In each instance, the reactive groups of the surface coating material will react with the appropriate groups of the quinoline while the quinoline itself reacts with the oxide on the metal surface, as more specifically described above.

The solutions of the 8-hydroxy quinoline derivative can comprise from about 1 part to about 50 parts of the quinoline per 1000 parts of solvent, e.g. ethanol, methanol, water etc. The treatment is preferably conducted at room temperature although higher or lower temperatures may be utilized, if desired. Complete chemisorption of the quinoline onto the metal surface is generally achieved in from about 5 to about 20 minutes, the lower the quinoline concentration, the longer the reaction time necessary.

As mentioned above, because a group reactive with the surface coating or layer is present on the quinoline, the foundation layer of the 8-hydroxy quinoline derivative affords a chemically available site whereby the reactive groups of a paint layer may chemically react to thereby form a tightly adhering coating or layer. Examples of paints, adhesives or other coatings which may be used include epoxy paints and adhesives, i.e. those containing chemically available

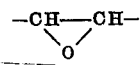

groups; urethane paints and adhesives, i.e. those containing chemically available NCO groups; acrylic paints and adhesives, i.e. those containing chemically available

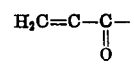

groups; vinyl paints and adhesives, i.e. those containing chemically available —CH=CH— groups and the like. As is clear from the enumeration of the chemically available groups of the above-mentioned paints, the available group is free to react with the available group of the 8-hydroxy quinoline derivative layer previously applied to the metal surface. These reactive groups are explicitly represented above and in the case of epoxy and urethane paints and adhesives would be —NH$_2$, —OH or —SH substituted groups, while in the case of acrylic or vinyl paints and adhesives, the reactive groups of the quinoline would be the unsaturated substituent, including vinyl, allyl etc.

The paints can be applied in a condition such that the reaction concurs while the paint vehicle evaporates or in a condition that the paint must more completely polymerize or cure before it forms a useful coating. In the latter case, if the functional group of the 8-hydroxy quinoline derivative is such that it initiates polymerization of the paint, the paint may be applied in a prepolymer or semipolymer condition. An example of such a treatment is illustrated by the use of a quinoline wherein Y is a hydroxy group and an epoxy prepolymer. In this case, the hydroxy group both reacts with and cures (polymerizes) the epoxy prepolymer.

Additionally, I have found that my novel processing procedure can be utilized in conjunction with known procedures to obtain a pseudosynergistic effect. For example, I can improve the corrosion resistance of metals treated according to my invention by first treating the metal with an inorganic chromate in a manner known in the art. Furthermore, the chromate (e.g. potassium dichromate, chromic acid solution, etc.) may be incorporated into the 8-hydroxy quinoline derivative solution of my novel method before treating the metal according to my invention. In this manner, the corrosion resistance of the metal is further increased without loss of the enhanced surface coating adherence mentioned above.

The 8-hydroxy quinoline derivatives useful in my invention are well known to those skilled in the art as are methods for their preparation. Generally, the derivatives may be prepared according to methods described by Przystal et al., J. Heterocyclic Chem., Vol. 4, page 131, 1967; Kolobielski, J. Heterocyclic Chem., Vol. 3, page 275, 1966; U.S. Pat. No. 2,892,741; Ito, Bull. Chem. Soc. Japan, Vol. 33, page 527, 1960; Kapoor et al., Indian J. Chem., Vol. 4, page 438, 1966; Japanese Pat. No. 1872 which references are hereby incorporated herein by reference. Additionally, many of the 8-hydroxy quinoline derivatives can be prepared by halogenation of 8-hydroxy quinoline and subsequent reaction with an appropriate compound according to the equation:

Furthermore, many of the derivatives are found in animal urine and can be isolated via known procedures.

The pretreating technique and products of the instant invention find utility in military, industrial and consumer fields such as aircraft and ship surfaces, cooling towers, heat exchangers, window screens, siding etc.

The following examples are set forth for purposes of illustration only and are not meant to be construed as limitations on the present invention except as set forth in the appended claims. All parts and percentages are by weight unless otherwise specified.

Example 1

Aluminum panels, 3×5, are degreased by dipping in benzene and further cleaned by dipping in a hot 10 percent solution of a commercially available aluminum cleaner. The panels are then allowed to dry in air. One panel is then immersed in a solution of 4-aminomethyl-8-hydroxy quinoline in ethanol. After 15 minutes the panel is removed and allowed to dry.

The panel is then spray painted with a commercially available epoxy paint and allowed to dry and cure for 5 days at room temperature.

The painted panel is then subjected to a modified version of the "Cross-Hatch Tape Test" formulated by the National Coil Coaters Association. In the test, the painted surface is cut 10 times vertically and 10 times horizontally with a razor blade, the scratch lines being approximately 5 mm. apart. Scotch cellopane tape No. 600 is applied over the test area and rubbed with sufficient pressure to remove all air bubbles. The panel is allowed to set for 10 minutes and the tape is then removed sharply with a pull at right angles to the test surface. A visual examination allows a reasonably accurate estimation of the percent finish remaining on the panel in the test area. The average results of tests conducted on panels treated according to example 1, in addition to the results recorded utilizing different quinolines according to the process of the present invention, are set forth in Table I, below.

TABLE I

| Example | Quinoline [1] | Solvent | Average percent of finish remaining | Number of panels tested |
| --- | --- | --- | --- | --- |
| 1 | 4-aminomethyl-8-hydroxy quinoline | Ethanol | 87 | 6 |
| 2 | 8-hydroxy-6-(p-hydroxyphenyl) quinoline | do | 78 | 6 |
| 3 | 5-carbamoyl-8-hydroxy quinoline | do | 82 | 6 |
| 4 | 3-allyl-8-hydroxy quinoline | do | [2] 85 | 6 |
| 5 | 4-(p-aminophenyl)-8-hydroxy quinoline | do | 71 | 4 |
| 6 | 8-hydroxy-(2-hydroxyethyl) quinoline | H$_2$O | 67 | 4 |
| 7 | 5-(4-butenyl)-8-hydroxy quinoline | H$_2$O | [3] 82 | 2 |
| 8 | 8-hydroxy-6-(p-mercaptophenyl) quinoline | Ethanol | 77 | 2 |
| 9 | 4-acryloyl-8-hydroxy quinoline | do | [2] 84 | 2 |
| 10 | Control (no treatment) | | 20 | 14 |

[1] In each of Examples 1-9, increased corrosion resistance of the metal was observed as a result of the quinoline foundation layer before application of any surface coating.
[2] Acrylic paint used in place of epoxy paint of Example 1.
[3] Vinyl paint used in place of epoxy paint of Example 1.

Example 11

The procedure of example 1 is again followed except that after cleaning the surface of the metal panel with a degreasing agent and an alkali cleaning agent, 3 parts of 3-hydroxypropyl-8-hydroxy quinoline are added to 100 parts of the catalyst-curing agent package of a commercially available, 2-package polyurethane adhesive composition. After blending the contents of the two packages together, the resultant mixture is applied to the clean aluminum panel and cured under the recommended conditions. The adhesive is bonded more tightly to

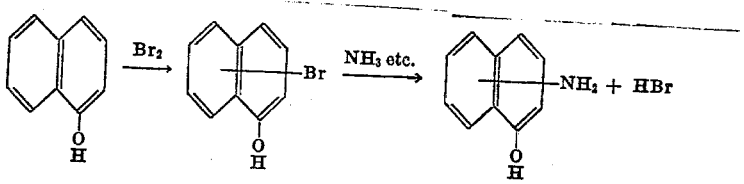

the metal panel than it is on a control specimen formed without the added quinoline.

Example 12

The procedure of example 1 is again followed except that in place of the epoxy paint used therein, a commercially available epoxy adhesive is used. The bonding of the adhesive to the metal is similar to that of the paint of said example.

Example 13

The procedure of example 11 is again followed except that a commercially available epoxy adhesive is used in place of the adhesive of said example and the metal used is steel. The adhesion of the adhesive to the steel panel is superior to that of a panel coated without the foundation layer of the quinoline derivative.

Example 14

The procedure of example 11 is again followed except that 8-hydroxy-3-vinyl quinoline is utilized in place of the quinoline used therein and the adhesive is replaced by an acrylic paint. The adhesion of the paint to the aluminum is superior to that of a test sample wherein no quinoline is present.

Example 15

The procedure of example 1 is again followed except that the metal treated is stainless steel. Similar results are observed.

Example 16

Following the procedure of example 1 except that the metal coated is carbon steel, effective paint adhesion results.

Example 17

The procedure of example 3 is followed with replacement of the aluminum panels with similar sized sections of titanium sheet. The adherence of the epoxy paint to the quinoline foundation layer is excellent.

Example 18

The use of nickel sheet for the aluminum panel of example 9 results in 82 percent of the epoxy paint finish remaining after two tests.

Example 19

The procedure of example 1 is again followed except that a commercially available, corrosion resistant nickel-chromium alloy is used in place of the aluminum panels thereof. The paint adhesion of the metal alloy is materially enhanced as against a sample wherein no quinoline derivative is utilized.

I claim:

1. A method which comprises coating a metal surface with a compound having the formula

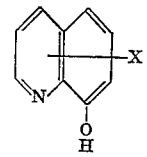

wherein X is a $\bigcirc\!\!-\!\!Y$ group, a $-\overset{O}{\underset{\phantom{.}}{C}}\!-\!Y$ group, an alkylene $(C_2\text{-}C_8)$ group, or an aliphatic radical containing an $NH_2$, $OH$ or $SH$ group, Y being $NH_2OH$, SH or an alkylene $(C_2\text{-}C_8)$ radical.

2. An article of manufacture comprising a metal surface having coated thereon a compound having the formula set forth in claim 1.

3. A method according to claim 1 wherein the metal surface is coated with said compound and a surface coating having groups chemically reactive with at least one of the groups of said compound is coated thereon.

4. A method according to claim 1 wherein said compound is coated onto said metal surface as a mixture with a surface coating having groups chemically reactive with at least one of the groups of said compound.

5. A method according to claim 1 wherein said compound is 4-aminomethyl-8-hydroxy quinoline.

6. A method according to claim 3 wherein said surface coating is a paint.

7. A method according to claim 4 wherein said surface coating is a paint.

8. A method according to claim 3 wherein said surface coating is an adhesive.

9. A method according to claim 4 wherein said surface coating is an adhesive.

10. An article according to claim 2 wherein said metal is aluminum.